United States Patent [19]

Kawasaki

[11] Patent Number: 4,807,973

[45] Date of Patent: Feb. 28, 1989

[54] MATRIX ADDRESS DISPLAY APPARATUS HAVING CONDUCTIVE LINES AND PADS FOR REPAIRING DEFECTS

[75] Inventor: Kiyohiro Kawasaki, Hirakata, Japan

[73] Assignee: Matsushita Electric Industrial Co., Ltd., Kadoma, Japan

[21] Appl. No.: 63,627

[22] Filed: Jun. 19, 1987

[30] Foreign Application Priority Data

Jun. 20, 1986 [JP] Japan .................... 61-145237

[51] Int. Cl.[4] .................... G02F 1/13; G09G 3/36; G01C 11/06
[52] U.S. Cl. .................... 350/332; 350/333; 350/334; 340/784
[58] Field of Search .............. 350/332, 333, 334, 336; 340/784, 765, 774; 357/45, 23.7, 30 H, 65, 23.6

[56] References Cited

U.S. PATENT DOCUMENTS

| | | | |
|---|---|---|---|
| 4,368,523 | 1/1983 | Kawate | 350/333 |
| 4,422,731 | 12/1983 | Droguet et al. | 350/334 |
| 4,549,200 | 10/1985 | Ecker et al. | 357/81 |
| 4,630,355 | 12/1986 | Johnson | 350/333 |
| 4,654,117 | 3/1987 | Aoki et al. | 350/332 |
| 4,688,896 | 8/1987 | Castleberry | 350/333 |
| 4,689,116 | 8/1987 | Coissard et al. | 350/333 |

FOREIGN PATENT DOCUMENTS

| | | | |
|---|---|---|---|
| 0197551 | 10/1986 | European Pat. Off. | 350/332 |
| 3502911 | 8/1985 | Fed. Rep. of Germany | 357/4 |
| 0178325 | 10/1983 | Japan | 350/334 |
| 0009634 | 1/1984 | Japan | 350/332 |

Primary Examiner—Stanley D. Miller
Assistant Examiner—Tai Van Duong
Attorney, Agent, or Firm—Cushman, Darby & Cushman

[57] ABSTRACT

A rescue line (18) is provided around the pixel part having display elements disposed on cross points of scanning lines (1) and signal lines (2) disposed vertically to the scanning lines (1): When one of the scanning lines (1) or the signal lines (2) is broken, the rescue line (18) is connected to both ends of the break line by the bonding pads for feeding the signal to the break line, and thereby defective function is restored.

8 Claims, 10 Drawing Sheets

MATRIX ADDRESS DISPLAY APPARATUS HAVING CONDUCTIVE LINES AND PADS FOR REPAIRING DEFECTS

FIELD OF THE INVENTION AND RELATED ART STATEMENT

1. Field of the Invention

The present invention relates to a matrix address display apparatus such as a liquid crystal display apparatus.

2. Description of the Related Art

FIG.1 shows the structure of a matrix address display apparatus of the prior art. The matrix type display apparatus has $2n$ of scanning lines 1 and $2m$ of signal lines 2 which are provided vertically to the scanning lines 1. The matrix type display apparatus has display elements such as liquid crystal cells or electroluminescence cells on cross points of the scanning lines 1 and the signal lines 2.

When one of the lines 1 is "broken" at a point 3, as shown in FIG.2, the signal is not fed to the display elements which is provided beyond the breaking point 3. Thus, the break point 3 causes quality deterioration of a displayed image. In the prior art in such case, the signal is fed to the broken scanning line 1 from a rescue terminal 4' for feeding the signal to the broken section of the scanning line 1. One end of a rescue line 8 is connected to a wiring 6 to which signal is fed, by connecting means 7 and another end of the rescue line 8 is connected to the rescue terminal 4' by connecting means 9 and connecting wiring 10. Therefore, the signal can be fed to the rescue terminal 4'.

When the electrode terminals 4 and 5 are made as large as possible for obtaining easy connection of the wirings 6, the rescue terminals 4' and 5' become small. Such small rescue terminals 4' and 5' makes actual wiring of line 10 difficult.

It is desirable that the rescue line 8 is provided on the image display apparatus 11, but the rescue line 8 provided on the image display apparatus 11 has a liability of making short-circuit with wiring of the lines 6. Therefore, the wiring process becomes difficult.

OBJECT AND SUMMARY OF THE INVENTION

It is an object of the present invention to provide a matrix address display apparatus which can be manufactured without difficulty.

A matrix address display apparatus, in accordance with the present invention, comprises,
a pixel part having a plurality of display elements disposed in matrix type,
scanning lines connected to the pixel part,
scanning electrodes connected to the scanning lines,
signal lines connected to the pixel part, signal electrodes connected to the signal lines,
a conductive layer insulated from the scanning lines are the signal lines and disposed surrounding the pixel part, and
connecting conductive parts which are connected to said scanning lines on said signal line for selectively connecting the conductive layer disposed near the scanning electrodes and the signal electrodes.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

Figure 1:
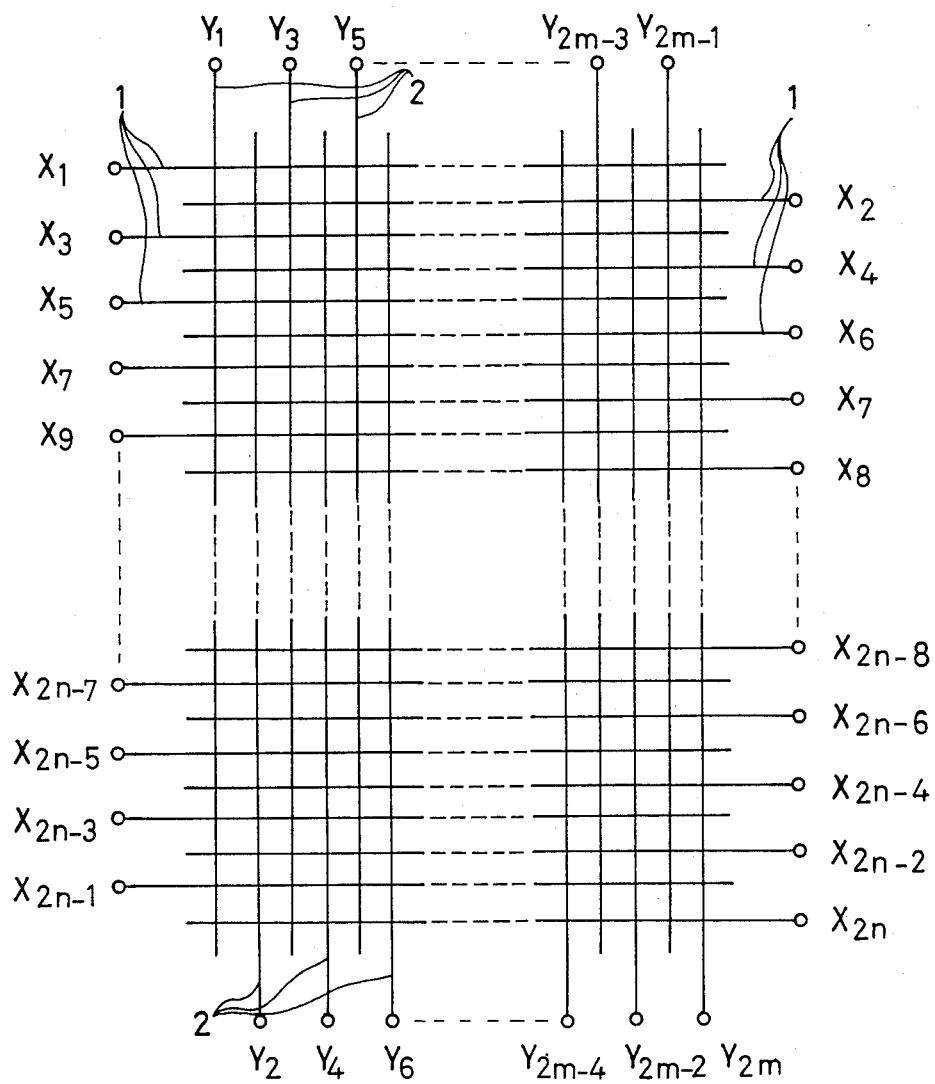
FIG. 1 is a plan view for showing the structure of the matrix type display apparatus of the prior art.
Figure 2:
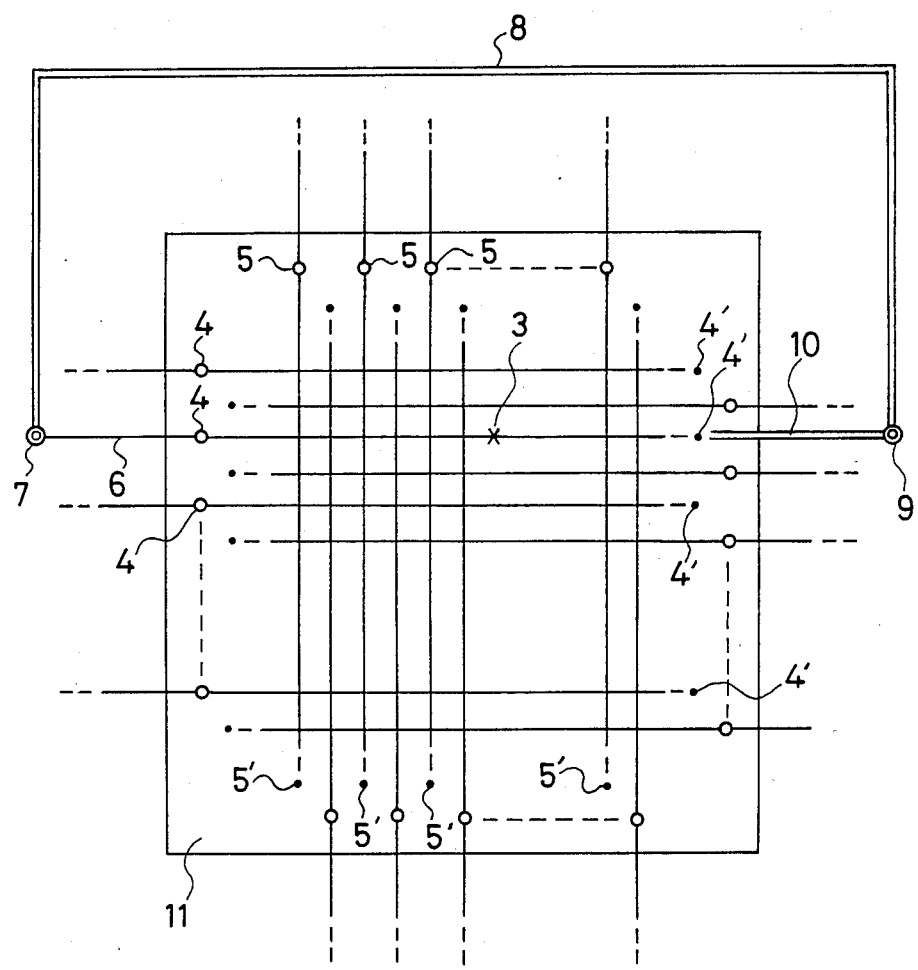
FIG. 2 is a plan view for showing the rescue operation for breaking of the matrix type display apparatus in FIG.1.
Figure 3:
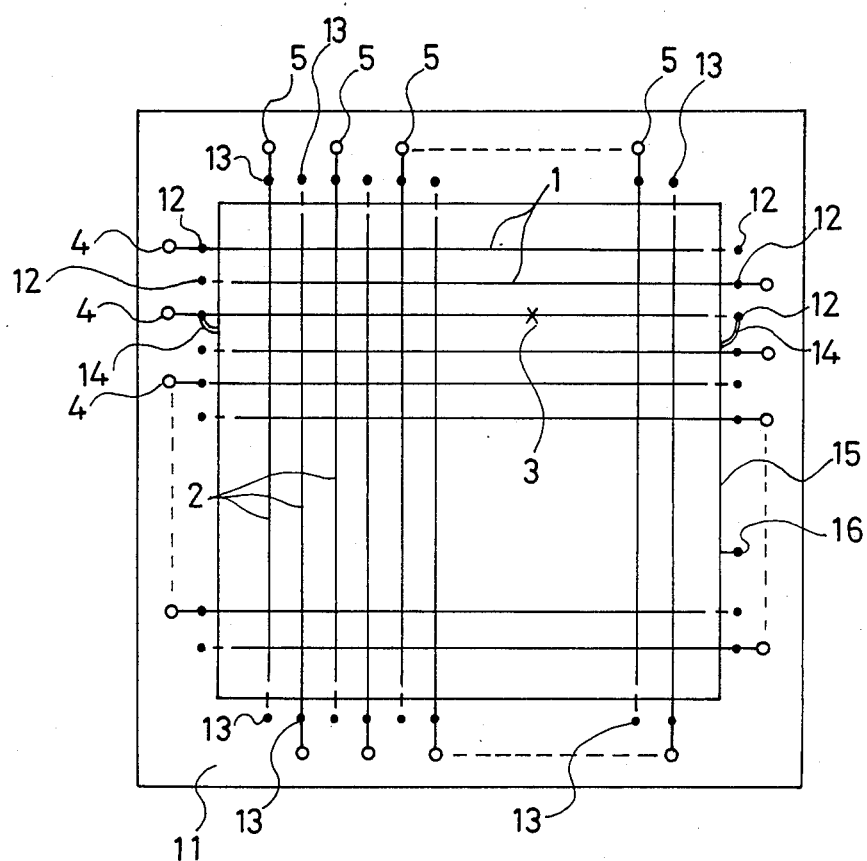
FIG. 3 is a plan view of a matrix type display apparatus of a first embodiment of the present invention.

FIG. 3 shows the structure of a matrix address display apparatus embodying the present invention. The matrix address display apparatus has $2n$ of scanning lines 1 and $2m$ of signal lines 2 which are provided vertically to the scanning lines 1. The matrix type display apparatus has as a display, a plurality of elements such as liquid crystal cells or electroluminescence cells on a cross point of the scanning lines 1 and the signal lines 2, thereby making a pixel part. Conductive parts 12 are provided at both ends of the scanning lines 1. Conductive parts 13 are provided at both ends of the signal lines 2. A rescue line 15 is provided surrounding the pixel part.

When one of the lines 1 is "broken" at a point 3, the conductive part 12 provided on one end of broken scanning line 1 and the rescue line 15 are connected by a conductor 14 used as a connecting means. Then, the conductive part 12 provided on the other end of broken scanning line 1 and the rescue line 15 are connected by a conductor 14. Therefore, the signal can be fed to the broken line 1 through the rescue line 15.

The conductor 14 can be formed by known wire-bonding of Al wire, Au wire, or the like. In such a case, the conductive parts 12 and 13 used as bonding pads generally have Al layers on top and at least a size of about 100 micrometer × 100 micrometer which is sufficient in this embodiment.

Some branch lines 16, which are connected to the rescue line 15, are preferably provided for use in other embodiments. In the case of using wire-bonding, the conductive part having Al layer on top is provided at the end of the branch line 16.

The rescue line 15 must be provided out of the way of the pixel part wherein pattern of the scanning lines 1 and the signal lines 2 cross and the display element are provided. Therefore, it is suitable that the rescue line 15 is provided between the periphery of electrodes 4, 5 and the pixel part, since the rescue operation for broken lines can be carried out independent to the connecting operation of the electrodes 4, 5 and the outer circuit. It is suitable that the rescue line 15 and the branch line 16 have exposed conductive parts on which the conductor 14 is provided for rescue. For avoiding the short-circuit at connecting operation of the electrodes 4, 5 and the outer circuit, the periphery part of the display apparatus 11 must not have exposed conductive parts other than the electrodes 4 and 5.

Figure 4:
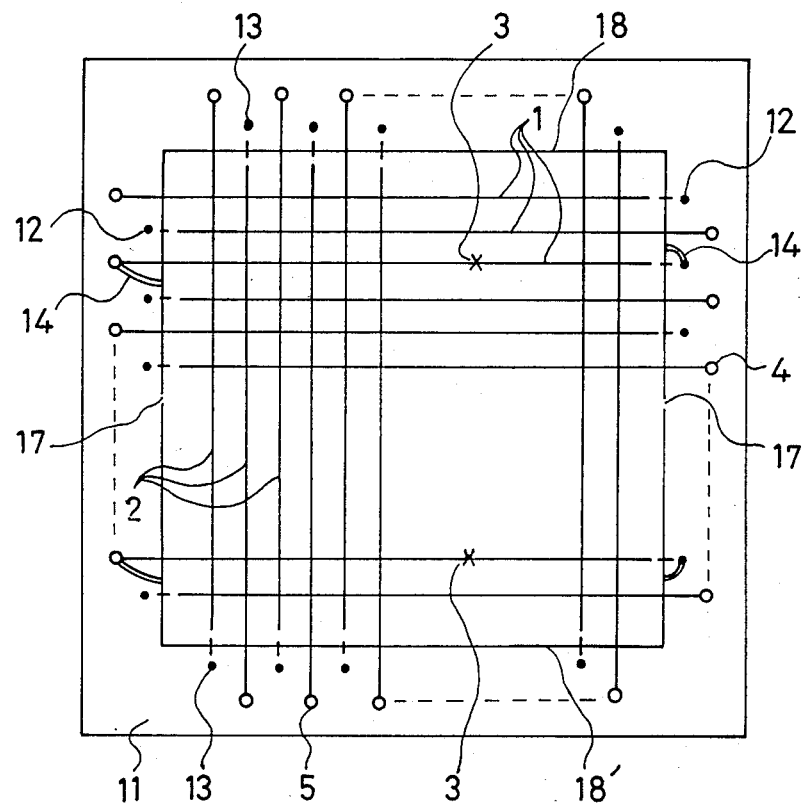
FIG. 4 is a plan view of a matrix type display apparatus of a second embodiment of the present invention.

FIG. 4 shows a matrix address display apparatus of a second embodiment of the present invention. In this embodiment, disconnection parts 17 are provided for dividing the rescue line into two rescue lines 18 and 18'. As a result of the dividing of the rescue line, two break points 3 can be rescued as shown in FIG.4. Further, the floating capacitance generated in the cross point of the rescue line and lines 1 and 2 is reduced.

In a third embodiment (not shown), for simplification of the manufacturing process, the rescue line is formed simultaneously with the scanning lines 1 or the signal lines 2. In the case where the scanning lines 1 and the signal lines 2 are formed on one substrate, the insulating layer for insulating both lines 1 and 2 is necessary. Therefore, it is easy to form the rescue line simultaneously with the scanning lines 1 or the signal lines 2. For obtaining small resistance, the rescue line 18 is made of a lower resistance material placed between the signal line and the scanning line.

Figure 5:
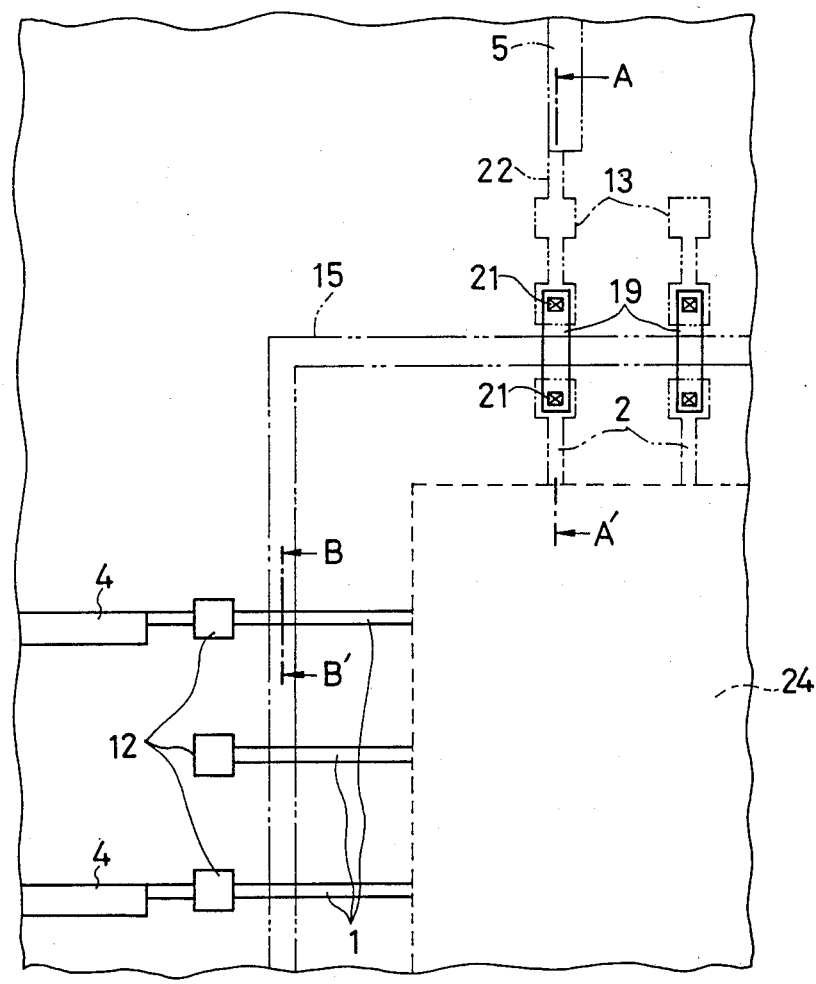
FIG. 5 is a partial enlarged view of a matrix type display apparatus of a fourth embodiment of the present invention.
Figure 6A:
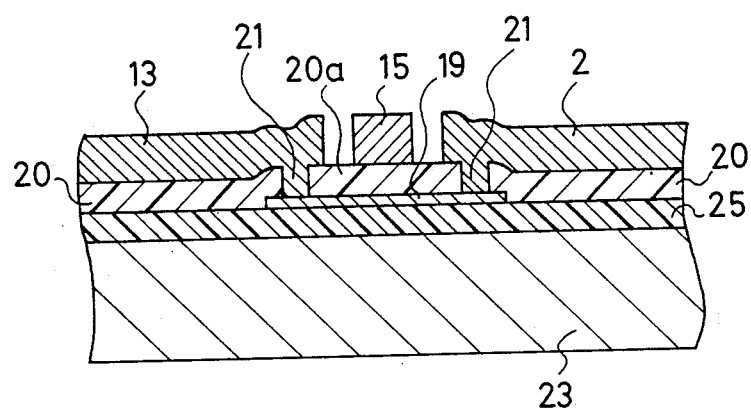
FIG. 6A is a sectional view taken along the line A—A' of FIG.5.
Figure 6B:
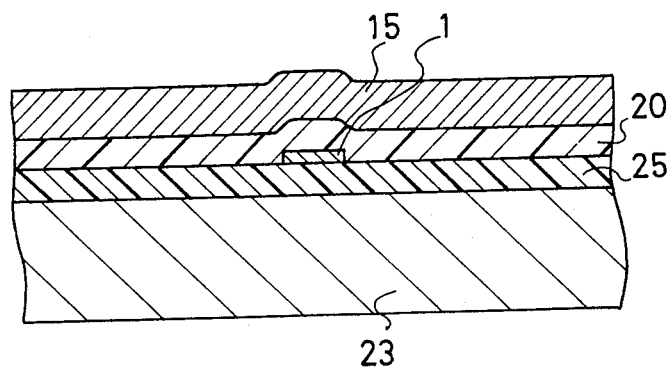
FIG. 6B is a sectional view taken along the line B—B' of FIG.5.

FIGS. 5, 6A and 6B shows a fourth embodiment of the present invention. FIG.5 is a plan view, FIG.6A is a sectional view taken along the line A—A' of FIG. 5, and FIG. 6B is a sectional view taken along the line B—B' of FIG. 5. In FIG. 6a, on a glass substrate 23 an insulating layer 25 is formed. An insulating layer 20, which has openings 21, is provided on the insulating layer 25. A conductive connecting line 19 is provided under the insulating layer 20a between the two openings 21 and 21. The signal line 2 is formed in the openings and on the insulating layer 20. The rescue lines 15 is formed on the insulating layer 20a. As described above, the signal electrode 5 and the signal line 2 are connected and the rescue line 15 is formed in a manner that the rescue line is insulated from the scanning line 1 and the signal line 2. The signal line 2 and the rescue line 15 may be of the same material (e.g. Al) and may be simultaneously formed. The connecting line 22 between the signal electrode 5 and the signal line may not be positioned on top of the substrate. However, when one part of the connecting line 22 is exposed (provided on top of the substrate), the exposed part can be used as the conductive part 13 as bonding pad for a rescue operation.

The insulating layer 20 is simultaneously formed as the insulating layer for pixel part 24. The conductive connecting line 19 is simultaneously formed with the scanning line 1. Therefore, the additional process is not necessary for forming the insulating layer 20 and the conductive connecting line 19. The structure shown in FIG. 6A can be applied to the scanning line 1.

Figure 7:
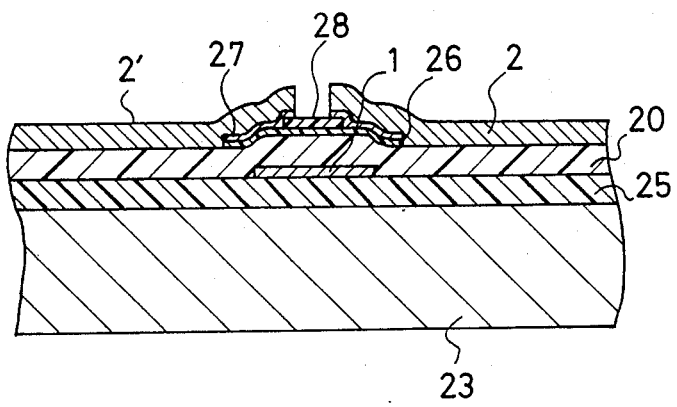
FIG.7 is a sectional view of a thin film transistor used in a matrix address display apparatus of a fifth embodiment.

FIG. 7 shows a sectional view of a thin film transistor used in a matrix address display apparatus of a fifth embodiment. $SiO_2$ film 25 is formed on a glass substrate 23. The scanning line 1 is used as a gate of the transistor. A gate insulating film 20 of $Si_3N_4$ is formed on the gate 1. Amorphous Si film 26, which includes very little impurity, is formed on the gate insulating film 20. Numerals 2 and 2' designate source-drain wiring of Al. Amorphous Si film 27 doped with a large quantity of impurity and is formed for improving the ohmic contact of the wiring 2 and 2' and the amorphous Si film 26. A protect film 28 of $Si_3N_4$ is formed for protecting the amorphous Si film 26 from the air. The source-drain wiring 2 operates as the signal line 2 and the source-drain wiring 2' operates as the wiring 2' for connecting transparent electrodes such as Indium-Tin-Oxide (ITO).

In this embodiment, the gate insulating film 20 is simultaneously formed and is the same material as the insulating layer of FIGS. 6A and 6B.

Figure 8:
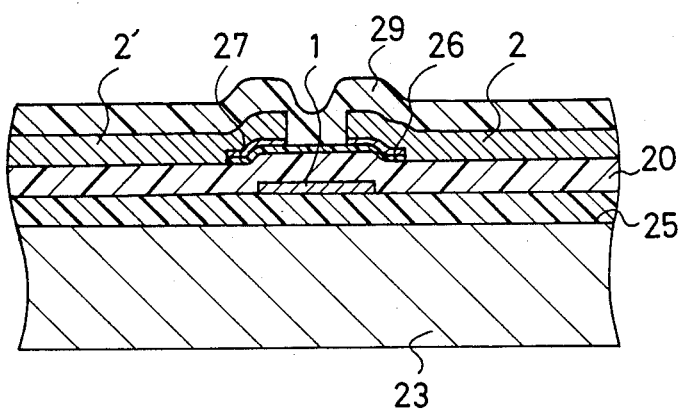
FIG.8 is a sectional view of a thin film transistor used in a matrix address display apparatus of a sixth embodiment.

FIG. 8 shows a sectional view of a thin film transistor used in a matrix address display apparatus of a sixth embodiment. In this embodiment, a protect film 29 is formed for protecting the amorphous Si film 26 (including liquid crystal) which forms a channel region. The protect film 29 can be made from inorganic material such as $Si_3N_4$ or organic material such as polyimide. In this embodiment, the structure made by the signal line 2, the connecting conductive line 19 and the insulating layer 20, (see FIG.6A), can be formed by using the signal lines 1 and 2' and the protective film 29.

Figure 9:
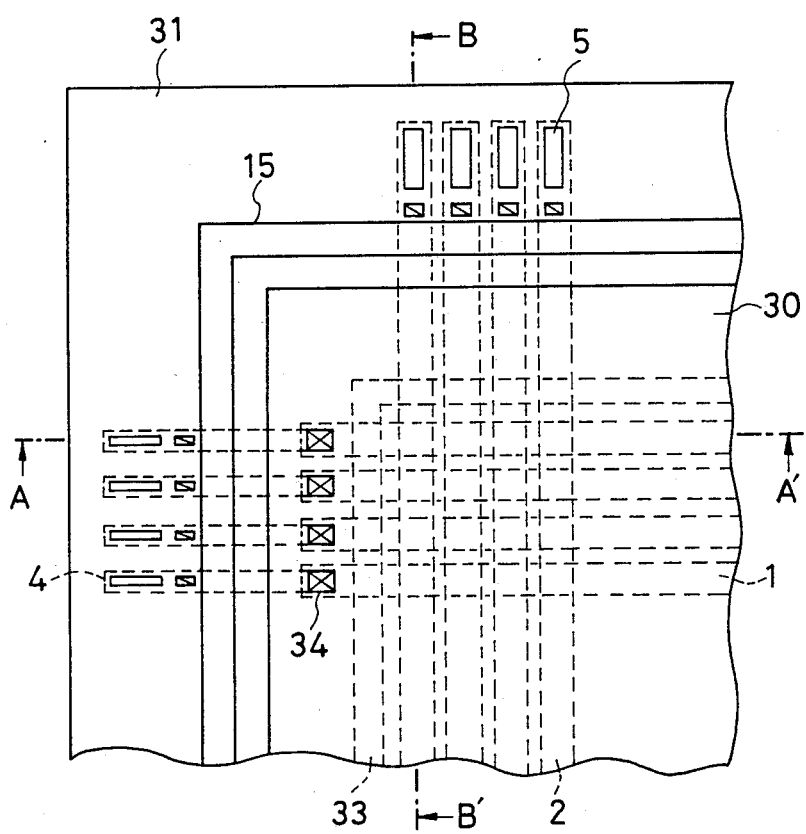
FIG.9 is a partial plan view of a matrix address display apparatus of a seventh embodiment.
Figure 10A:
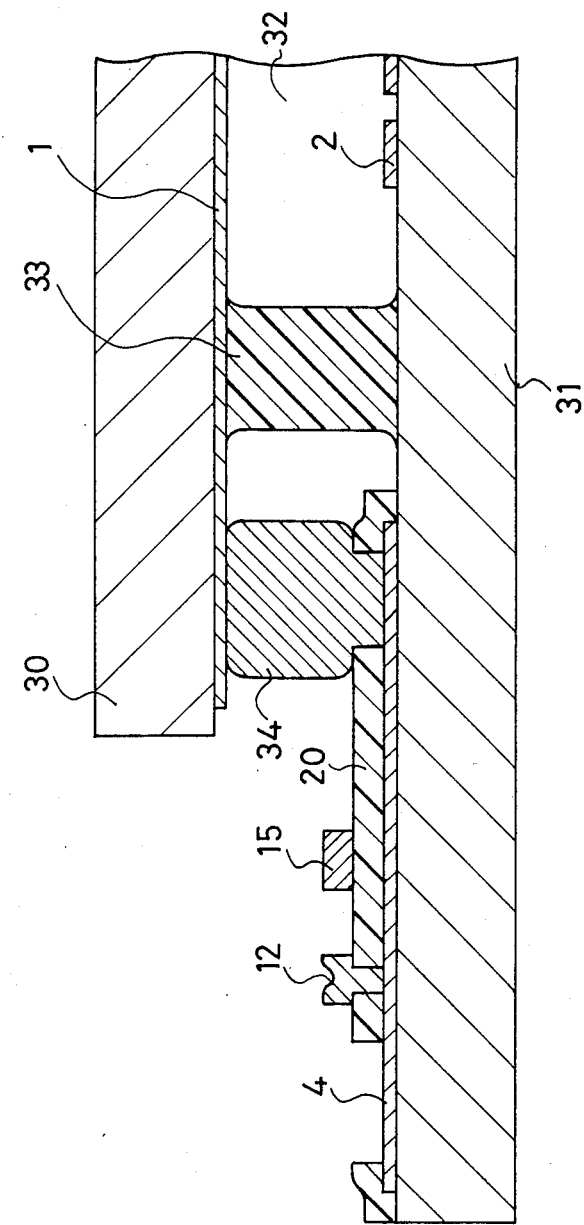
FIG. 10A is a sectional view taken along the line A—A' of FIG.9.
Figure 10B:
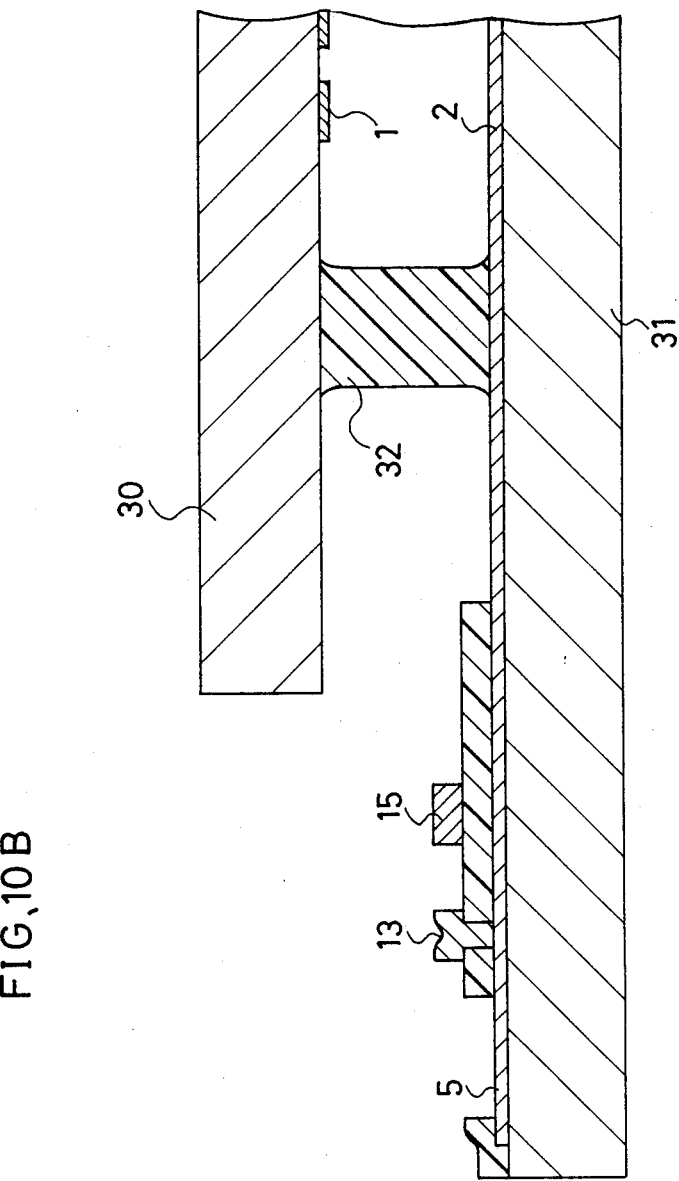
FIG. 10B is a sectional view taken along the line B—B' of FIG.9.

FIG. 9 is a partial plan view of a matrix address display apparatus of a seventh embodiment. FIG.10A is a sectional view taken along the line A—A' of FIG.9 and FIG. 10B is a sectional view taken along the line B—B' of FIG. 9. In this embodiment, the scanning lines 1 are formed on a substrate 30 and the signal lines 2 are formed on another substrate 31. The scanning lines 1 and signal lines 2 are of transparent conductive film such as ITO. The substrates 30 and 31 are put together with predetermined gap 32 wherein the liquid crystal is filled. A sealing member 33 is provided between the substrates 30 and 31.

A resin composition 34 including much carbon is formed on the scanning electrode 4 for connecting the scanning line 1 to the scanning electrode 4. The insulating layer 20 is formed for insulating the rescue line 15 from the scanning electrodes 4 and the signal electrodes 5. For the insulating layer 20, $SiO_2$, $Si_3N_4$ or polyimide resin may be used. In the insulating layer 20, openings are formed for the conductive parts 12 and 13. When one of the lines 1 or 2 is broken, the conductive parts 12 or 13 are connected to the rescue line 15, thereby restoring the designed function.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed is:

1. A matrix address display apparatus comprising:
   a pixel part having a plurality of display elements disposed in a matrix;
   scanning lines connected to said pixel part;
   scanning electrodes connected to said scanning lines;
   signal lines connected to said pixel part;
   signal electrodes connected to said signal lines;
   a conductive layer insulated from said scanning lines and said signal lines and disposed as a closed loop around said pixel part; and connecting conductive parts, which are connected to said scanning line or said signal line, for selectively connecting said conductive layer disposed near said scanning electrodes and said signal electrodes.

2. A matrix address display apparatus in accordance with claim 1, wherein:
   said conductive layer is provided as a loop around said pixel part and is divided into two parts for electrically separating divided parts from each other.

3. A matrix address display apparatus in accordance with claim 1, wherein:
   said conductive layer is formed by a low conductived material which is the same material used for said scanning lines or said signal lines.

4. A matrix address display apparatus in accordance with claim 1, wherein:
   said scanning lines and said signal lines are connected by a conductive line formed under an insulating layer and said conductive line and said insulating layer are provided at the perihery of said pixel part; and
   said conductive layer is formed on said insulating layer.

5. A matrix address display apparatus in accordance with claim 4, wherein:
   said insulating layer is a gate insulating layer of a thin film transistor for a switching device formed near a cross point of said scanning lines and signal lines.

6. A matrix address display apparatus in accordance with claim 5, wherein:
   said insulating layer is a protective layer of a channel part of the thin film transistor for the switching device formed near a cross point of said scanning lines and said signal lines.

7. A matrix address display apparatus in accordance with claim 4, wherein:
   said conductive lines are simultaneously formed with said scanning lines or said signal lines; and
   said conductive layer is simultaneously formed with said scanning lines or said signal lines.

8. A matrix address display apparatus in accordance with claim 1, further comprising:
   a substrate on which first conductive parts are formed in both ends of said signal lines or scanning lines; and
   another substrate on which second conductive parts are formed, said second conductive parts are connected to said signal electrodes or scanning electrodes of said another substrate for feeding signals from an outer circuit.

* * * * *